United States Patent
Kang et al.

(10) Patent No.: US 8,261,301 B2
(45) Date of Patent: Sep. 4, 2012

(54) BROADCAST RECEIVER AND METHOD FOR MANAGING RESERVED RECORDING INFORMATION

(75) Inventors: Sung Suk Kang, Incheon (KR); Seung Jin Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 715 days.

(21) Appl. No.: 11/508,855

(22) Filed: Aug. 24, 2006

(65) Prior Publication Data

US 2007/0047907 A1 Mar. 1, 2007

(30) Foreign Application Priority Data

Aug. 25, 2005 (KR) ........................ 10-2005-0078303

(51) Int. Cl.
- *G06F 3/00* (2006.01)
- *G06F 13/00* (2006.01)
- *H04N 5/445* (2006.01)
- *H04N 5/76* (2006.01)

(52) U.S. Cl. ............... 725/44; 725/39; 725/52; 386/297

(58) Field of Classification Search ........................ None
See application file for complete search history.

(56) References Cited

U.S. PATENT DOCUMENTS

| 7,493,646 | B2 * | 2/2009 | Ellis .............................. 725/87 |
| 2002/0174430 | A1 * | 11/2002 | Ellis et al. ...................... 725/46 |
| 2003/0046699 | A1 * | 3/2003 | Nonomura et al. ............. 725/58 |
| 2003/0115604 | A1 * | 6/2003 | Yamamura et al. ............. 725/55 |
| 2003/0154477 | A1 * | 8/2003 | Hassell et al. .................. 725/39 |
| 2005/0034154 | A1 | 2/2005 | Yeh et al. |

FOREIGN PATENT DOCUMENTS

| EP | 1 324 600 A2 | 7/2003 |
| WO | WO 01/76239 A2 | 10/2001 |

\* cited by examiner

*Primary Examiner* — Mark D Featherstone (74) *Attorney, Agent, or Firm* — Birch, Stewart, Kolasch & Birch, LLP (57) ABSTRACT

A broadcast receiver and a method for managing reserved recording information are disclosed. If a cell for a reserved recording list is added to an EPG (Electronic Program Guide), a user can easily check, modify, or delete all information associated with the reserved recording on the EPG, such that the user can conveniently manage the reserved recording information on the EPG. A method for managing reserved recording information of a broadcast receiver includes the steps of: a) receiving a reserved recording signal of a specific program; b) storing reserved recording information of the program on the basis of the reserved recording signal; and c) loading the stored reserved recording information, inserting the loaded reserved recording information into a pre-stored Electronic Program Guide (EPG), and creating an EPG-reserved recording list.

23 Claims, 6 Drawing Sheets

BROADCAST RECEIVER AND METHOD FOR MANAGING RESERVED RECORDING INFORMATION

This application claims the benefit of Korean Patent Application No. 10-2005-0078303, filed on Aug. 25, 2005, which is hereby incorporated by reference as if fully set forth herein.

BACKGROUND OF THE INVENTION

1. Field of the Invention

The present invention relates to a broadcast receiver and a method for managing reserved recording information, and more particularly to a broadcast receiver for generating reserved recording information of a broadcast program using an Electronic Program Guide (EPG), and performing registration, modification, and cancellation of a reserved recording on the EPG, and a method for managing reserved recording information.

2. Discussion of the Related Art

Typically, with the increasing development of digital technology in modern society, information communication technology, electronic technology, and Internet-associated technology are rapidly developed, resulting in the implementation of high-level information society.

Conventionally, a user has acquired desired information from information sources by physically contacting the information sources. However, presently, the user can acquire the desired information from the information sources via a wired or wireless medium, and can also receive the desired information from the information sources in real time by wire or wirelessly, such that necessary information can rapidly spread over a network such as the Internet.

TV broadcast technology is being rapidly digitized, such that digital TVs of individual households are being widely used as huge and effective information storage mediums and information providers.

In recent times, an A/V (Audio/Video) device includes a variety of basic functions (e.g., a terrestrial broadcast receiving function, a cable broadcast receiving function, a satellite broadcast receiving function, a digital broadcast reception function, and an analog TV reception function, etc.), and also includes additional functions (e.g., a DVD-player function, and an MP3-player function). In order to acquire many more functions from the A/V device, the basic functions and the additional functions are effectively combined and related to each other.

Particularly, DTV (digital TV)—associated products are classified into a variety of DTV products, for example, a DTV for recording broadcast data in a Hard Disc Drive (HDD), a DTV for simultaneously displaying/recording broadcast data using at least two tuners, a DTV for simultaneously recording broadcast data of at least two channels, and a DTV manufactured by combination of various applications (e.g., a PIP). A set-top box (STB) including at least four tuners has also been introduced to the market.

Figure 1:
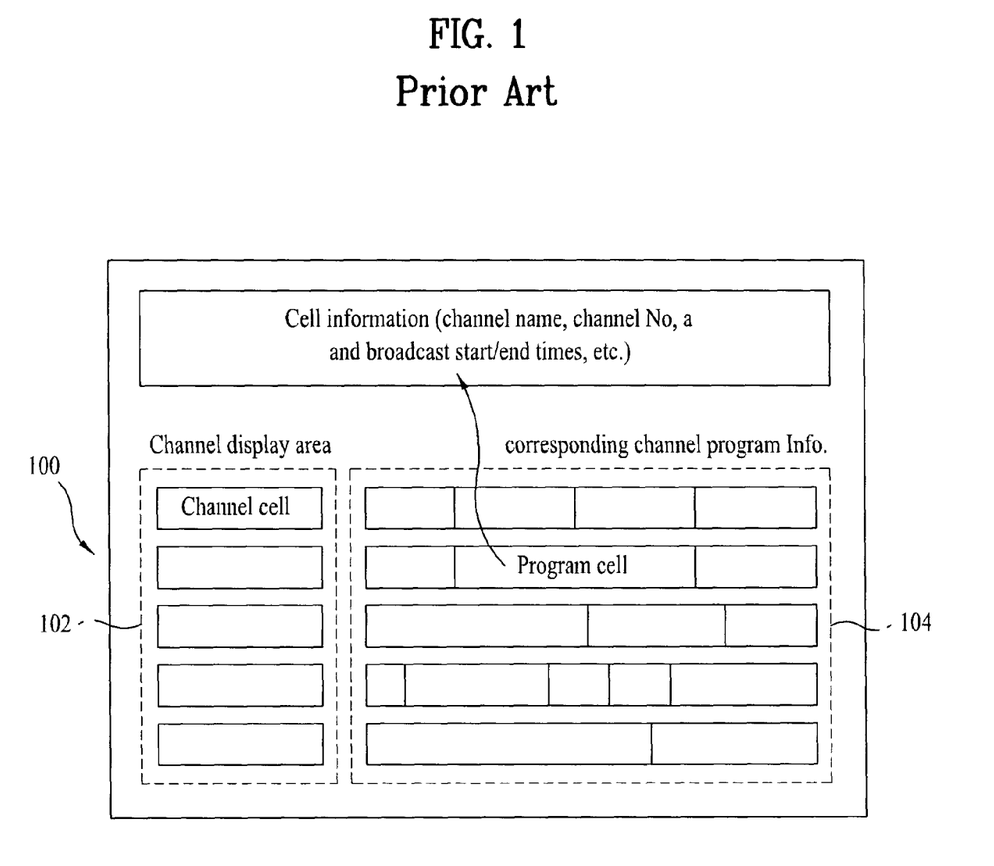
FIG. 1 exemplarily shows a conventional EPG display image.

The above-mentioned DTV set or STB provides a user with an Electronic Program Guide (EPG) of FIG. 1 using a PSIP (Program & System Information Protocol) information. Recently, a PVR (Personal Video Recorder) equipped with a HDD is newly introduced to the market, such that a reserved recording function on the EPG is widely added to the above-mentioned DTV or STB.

FIG. 1 exemplarily shows a conventional EPG display image.

Referring to FIG. 1, the EPG display image 100 includes a channel display area 102 and an area 104 for providing corresponding channel program information (hereinafter referred to as a channel program information provision area 104).

The channel display area 102 is composed of a plurality of channel cells capable of providing channel information. The channel program information provision area 104 provides a corresponding program title for each cell.

If the user selects a desired program cell from the channel program information provision area 104, a detailed information image of a corresponding program is displayed.

A variety of information is displayed on the detailed information image, for example, detailed information (e.g., a channel number, a program title, and a broadcast start/end time) of a corresponding program, a reserved recording button, and a cancellation button, etc.

The user can perform reserved recording of a corresponding program using the reserved recording button.

The reserved recording program registered on the EPG is indicated on a corresponding program cell, such that the user can recognize the presence or absence of reserved recording of a desired program or can cancel the reserved recording of the program using a User Interface (UI).

The user can view desired broadcast program information on the EPG, and can perform or cancel the reserved recording of a desired program, such that the user can conveniently perform the reserved recording function as compared to an analog-type VCR.

However, domestic broadcast environments have not yet provided the user with correct PSIP information, and currently broadcast excessive broadcast data to the user before and after broadcasting the principal programs.

Due to the above-mentioned problems, if the user performs reserved recording of a desired broadcast program using only program broadcast time information of the EPG, the desired broadcast program may be erroneously recorded while being partially deleted, or unnecessary broadcast programs may also be recorded.

Therefore, the user must manually select a desired reserved time different from the program start/end times on the EPG, and must register the reserved recording function to be activated at the reserved time, such that the reserved recording function is actually activated at the user-desired reserved time instead of the actual program start/end times.

However, an internal module of the EPG can visually indicate the reserved recording registration of only some programs, which are contained in a reserved recording list or correctly coincide with the program start/end times on the EPG. Therefore, the above-mentioned EPG internal module has a disadvantage in that it is unable to visually indicate the reserved recording registration of user-selected programs or other programs having changed start/end times due to the modification of PSIP information, such that the user is unable to recognize whether the reserved recording function is registered by referring to the EPG. In this case, the user must directly view the reserved recording list, such that the user has difficulty in registering, modifying, and canceling the reserved recording function, resulting in greater inconvenience of the user.

SUMMARY OF THE INVENTION

Accordingly, the present invention is directed to a broadcast receiver and a method for managing reserved recording information, that substantially obviate one or more problems due to limitations and disadvantages of the related art.

An object of the present invention is to provide a broadcast receiver for providing a User Interface (UI), and a method for managing reserved recording information, wherein the UI manages the reserved recording information on the EPG and effectively combines registration-, modification-, and cancellation-functions of the reserved recording.

Another object of the present invention is to provide a broadcast receiver for effectively providing a user with reserved recording information of a user-selected program (having a recording time changed by the user) or a PSIP-changed program after the reserved recording function is registered, and a method for managing reserved recording information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for managing reserved recording information of a broadcast receiver comprises the steps of: a) receiving a reserved recording signal of a specific program; b) storing reserved recording information of the program on the basis of the reserved recording signal; and c) loading the stored reserved recording information, inserting the loaded reserved recording information into a pre-stored Electronic Program Guide (EPG), and creating an EPG-reserved recording list.

Preferably, the created EPG-reserved recording list includes an EPG information provision area and a reserved recording list provision area.

Preferably, the reserved recording list provision area includes: a reserved recording display cell; and a reserved recording list display area for displaying a channel number of the reserved recording program registered by a user in cell units.

In another aspect of the present invention, there is provided a method for managing reserved recording information of a broadcast receiver comprising the steps of: a) receiving a reserved recording list output signal; b) displaying a pre-stored EPG (Electronic Program Guide)-reserved recording list on the basis of the received signal; c) if a single cell is selected from among a display area of the displayed EPG-reserved recording list, displaying a detailed information image of a program corresponding to the selected cell; and d) editing reserved information of the program by referring to the displayed detailed information image.

In yet another aspect of the present invention, there is provided a method for managing reserved recording information of a broadcast receiver comprising the steps of: a) receiving a reserved recording list output signal; b) displaying a pre-stored EPG (Electronic Program Guide)-reserved recording list on the basis of the received signal; c) editing reserved information of a program selected from a display area of the displayed EPG-reserved recording list; and d) updating the EPG-reserved recording list using the edited information.

Preferably, the detailed information image of the program displays detailed information of the program, a reserved recording modification button, and a reserved recording deletion button.

Preferably, the editing step of the reserved information on the displayed detailed information image includes the steps of: modifying the reserved information using a reserved recording modification button of the detailed information image; and deleting the reserved information using a reserved recording deletion button.

Preferably, the displayed EPG-reserved recording list includes an EPG information provision area and a reserved recording list provision area.

Preferably, the EPG information provision area displays EPG information; and the reserved recording list provision area which includes a reserved recording display cell, and a reserved recording list display area capable of displaying a channel number and/or a program title of the reserved recording program registered by a user in cell units.

In yet another aspect of the present invention, there is provided a broadcast receiver comprising: a User Interface (UI) for entering reserved recording information of a broadcast program, and outputting the reserved recording information; a demultiplexer for separating additional information data including Electronic Program Guide (EPG) information from received broadcast signals; a controller for loading the EPG information, inserting the program's reserved recording information into an EPG-information cell, and creating an EPG-reserved recording list database (DB); and a storage unit for storing the EPG information, reserved recording list data, and the created EPG-reserved recording list data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
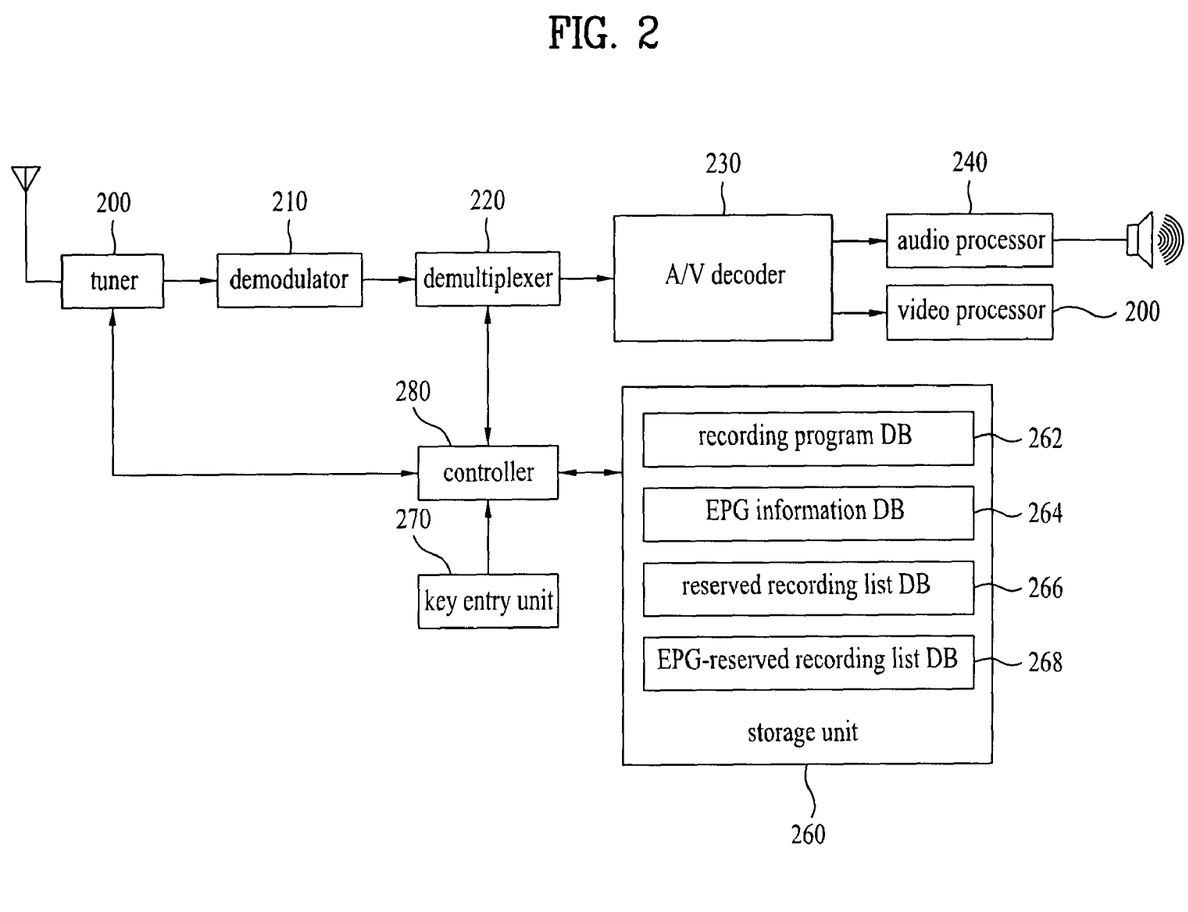
FIG. 2 is a block diagram illustrating a digital broadcast receiver for managing reserved recording information using an EPG according to the present invention.

FIG. 2 is a block diagram illustrating a digital broadcast receiver for managing reserved recording information using an EPG according to the present invention.

Referring to FIG. 2, the digital broadcast receiver capable of managing the reserved recording list using the EPG includes a tuner 200, a demodulator 210, a demultiplexer 220, an A/V decoder 230, an audio processor 240, a video processor 250, a storage unit 260, a key entry unit 270, and a controller 280.

The tuner 200 performs tuning of broadcast signals.

The demodulator 210 demodulates signals tuned by the tuner 200 to correct errors of the signals, and converts the demodulated signals into a transport stream signal.

The demultiplexer 220 performs demultiplexing of the time-multiplexed transport stream signal to separate a video-signal stream, an audio-signal stream, and an additional-information-signal stream from the demultiplexed signal. In this case, the additional information signal includes EPG information.

The A/V decoder 230 extends or recovers the video and audio signal streams separated by the demultiplexer 220.

The audio processor 240 converts audio signals received from the A/V decoder 230 into analog audio signals, such that the analog audio signals are outputted via a speaker.

The video processor 250 converts the video signal received from the A/V decoder 230 into brightness and color signals, such that the video signal can be visually displayed on the screen image.

The storage unit 260 stores program-associated information (e.g., EPG information), detailed information of the program, and recorded program information, etc.

The storage unit 260 includes a recording program database (DB) 262 for storing recorded programs; an EPG information DB 264 for storing EPG information contained in a VBI (Vertical Blanking Interval) of broadcast signals received from the tuner 200; a reserved recording list DB 266 for storing a reserved recording list of a user-reserved program; and an EPG-reserved recording list DB 268 for modifying the reserved recording list stored in the reserved recording list DB 266 into another list according to the EPG cell structure stored in the EPG information DB 264, and storing the modified list along with the EPG.

Therefore, if the user enters a reserved recording list output signal or an EPG information output signal, the EPG-reserved recording list stored in the EPG-reserved recording list DB 268 is displayed.

The key entry unit 270 receives a command from the user, and transmits the user command to the controller 280. A representative example of the key entry unit 270 is a remote-controller.

The controller 280 controls operations of individual components of the digital broadcast receiver.

Upon receiving a reserved recording signal from the key entry unit 270, the controller 280 stores the reserved recording list corresponding to the reserved recording signal in the reserved recording list DB 266.

Whenever a single reserved recording list is registered by the user, the controller 280 configures the reserved recording list in the reserved recording list DB 266, and manages the reserved recording medium list.

The controller 280 periodically generates a reserved recording task, performs the reserved recording of a corresponding program at the reserved recording time, deletes the reserved recording-completed list from the reserved recording list DB 266, and updates the reserved recording list.

If the reserved recording list is stored in the reserved recording list DB 266, the controller 280 acquires an EPG from the EPG information DB 264, modifies the reserved recording list into another list to be displayed on the EPG cell, and generates individual cells in the reserved recording list display area, such that it displays individual information registered in the reserved recording list.

In other words, if the user selects the EPG reserved recording list output command using the key entry unit 270, the controller 280 displays the EPG-reserved recording list stored in the EPG-reserved recording list DB 268. The displayed EPG-reserved recording list is configured by adding the reserved recording list to the EPG, and each reserved recording list is indicated by a cell.

The user can modify or delete reserved recording registration information using the displayed EPG-reserved recording list.

In other words, if the user selects a desired reserved recording cell from among the reserved recording list display area, and modifies or deletes the selected reserved recording cell, the controller 280 searches for a reserved recording ID corresponding to the selected reserved recording list from among the reserved recording list DB 266, modifies or deletes information of the reserved recording ID, updates a corresponding cell contained in the EPG reserved recording list stored in the EPG-reserved recording list DB 268, and displays the updated cell.

If the user registers the reserved recording on the EPG, and changes start/end times of the registered program, the controller 280 modifies program reserved recording registration information stored in the EPG-reserved recording list DB 268, such that it displays the modified result.

Although the user registers the reserved recording of a specific program in the EPG, and the start/end times of the reserved recording-registered program are modified into other start/end times due to the modification of PSIP information, the controller 280 can display reserved recording registration information of the program.

The above-mentioned digital broadcast receiver further includes a stream for displaying/managing reserved recording information in the EPG in order to generate the EPG-reserved recording list, and performs an edition function associated with the reserved recording function on the basis of the EPG-reserved recording list.

As a result, although the user modifies a reserved recording time of a specific program into another time, and the PSIP information is modified into another information, the digital broadcast receiver retrieves the EPG-reserved recording list, and updates the reserved recording information on the basis of the retrieved EPG-reserved recording list.

Figure 3:
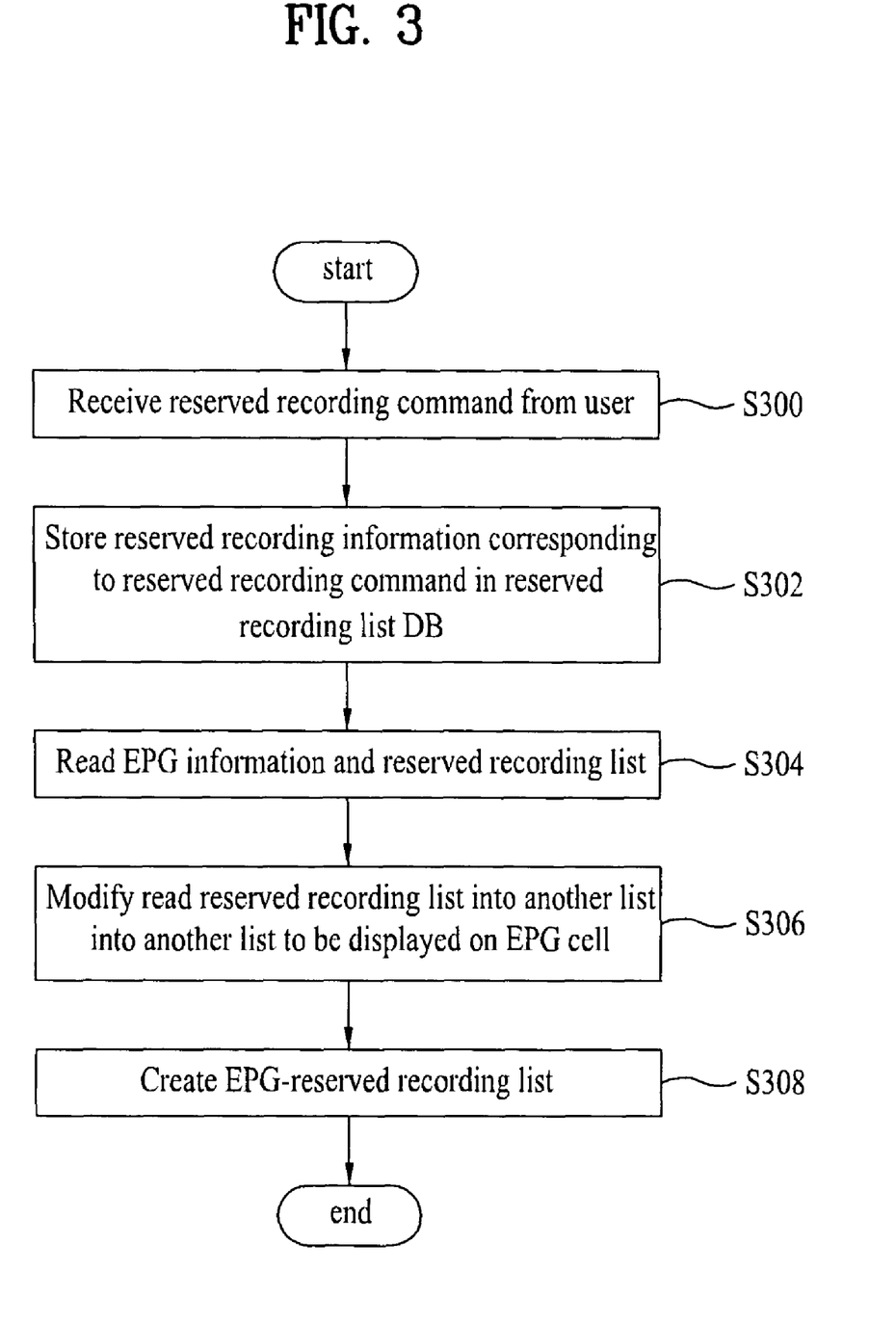
FIG. 3 is a flow chart illustrating a method for managing reserved recording information using an EPG according to the present invention.

FIG. 3 is a flow chart illustrating a method for managing reserved recording information using an EPG according to the present invention.

Referring to FIG. 3, upon receiving a reserved recording signal from the user at step S300, the digital broadcast receiver stores reserved recording information corresponding to the received reserved recording signal in the reserved recording list DB at step S302.

In other words, the user select a desired reserved recording program from the EPG information using a cursor. The user selects a reserved recording program from the EPG information using a menu, and can perform the reserved recording of the selected program.

If the user enters the reserved recording command of a specific broadcast program as described above, the digital broadcast receiver stores a variety of information of the specific broadcast program in the reserved recording list DB. For example, a reserved recording ID, a channel number, a channel start time, a recording length, a repetition setup, a program title, and a channel end time of the broadcast program are stored in the reserved recording list DB.

In this case, the above-mentioned digital broadcast receiver periodically checks the beginning of the reserved recording function, begins to record the broadcast program, and updates the recorded list.

If the reserved recording information corresponding to the reserved recording signal is stored in the reserved recording list DB at step S302, the digital broadcast receiver reads EPG information from the EPG information DB, and reads the reserved recording list from the reserved recording list DB at step S304.

The digital broadcast receiver modifies the read reserved recording list into another list to be displayed on the EPG cell at step S306. The digital broadcast receiver forms each cell in the reserved recording list display area, and displays each information registered in the reserved recording list, such that it configures the EPG-reserved recording list of FIG. 5A at step S308.

A method for modifying/deleting the reserved recording information using the above-mentioned EPG reserved recording list will hereinafter be described with reference to FIG. 4.

Figure 4:
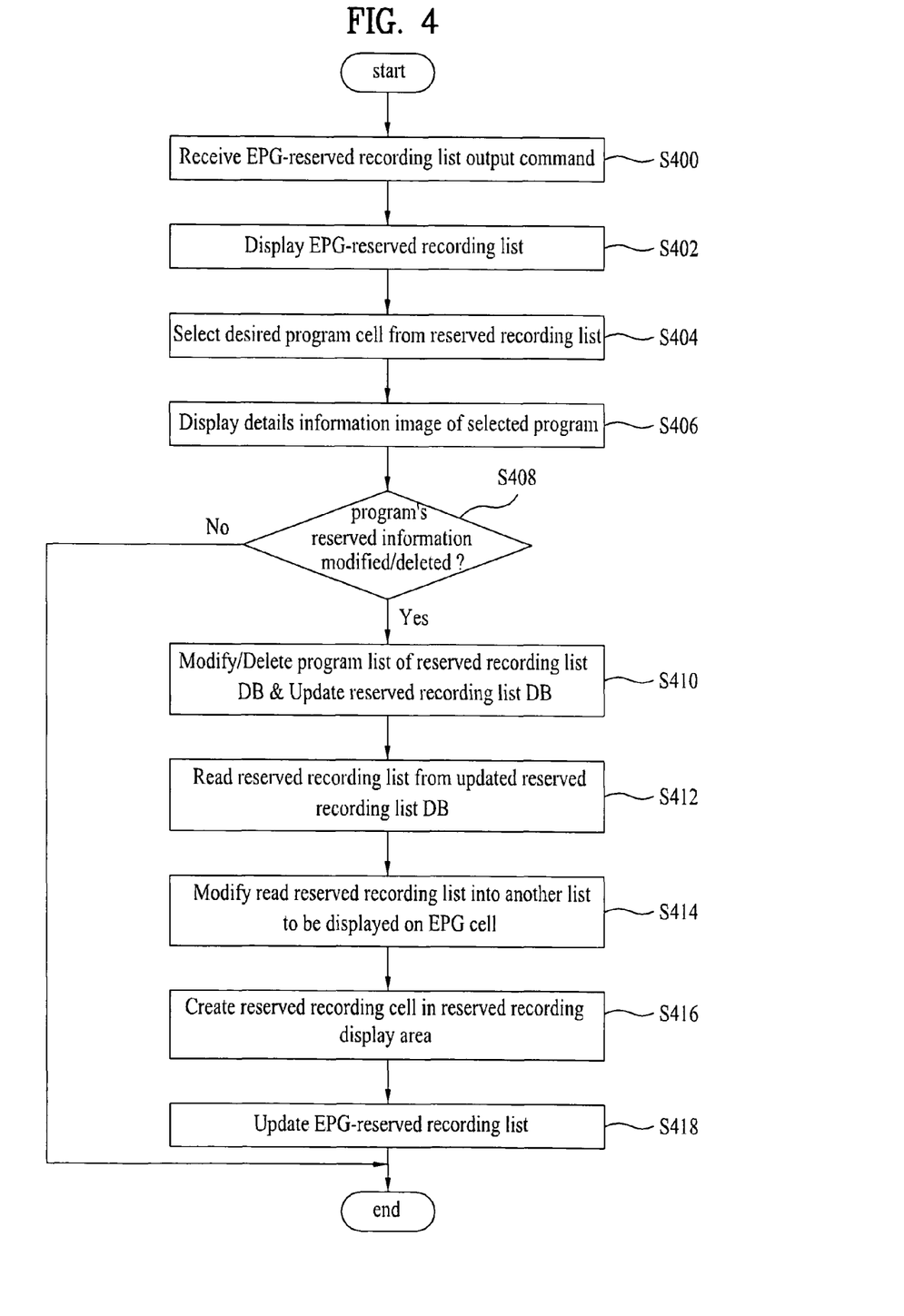
FIG. 4 is a flow chart illustrating a method for modifying/deleting a reserved recording list using EPG reserved recording information according to the present invention.
Figure 5A:
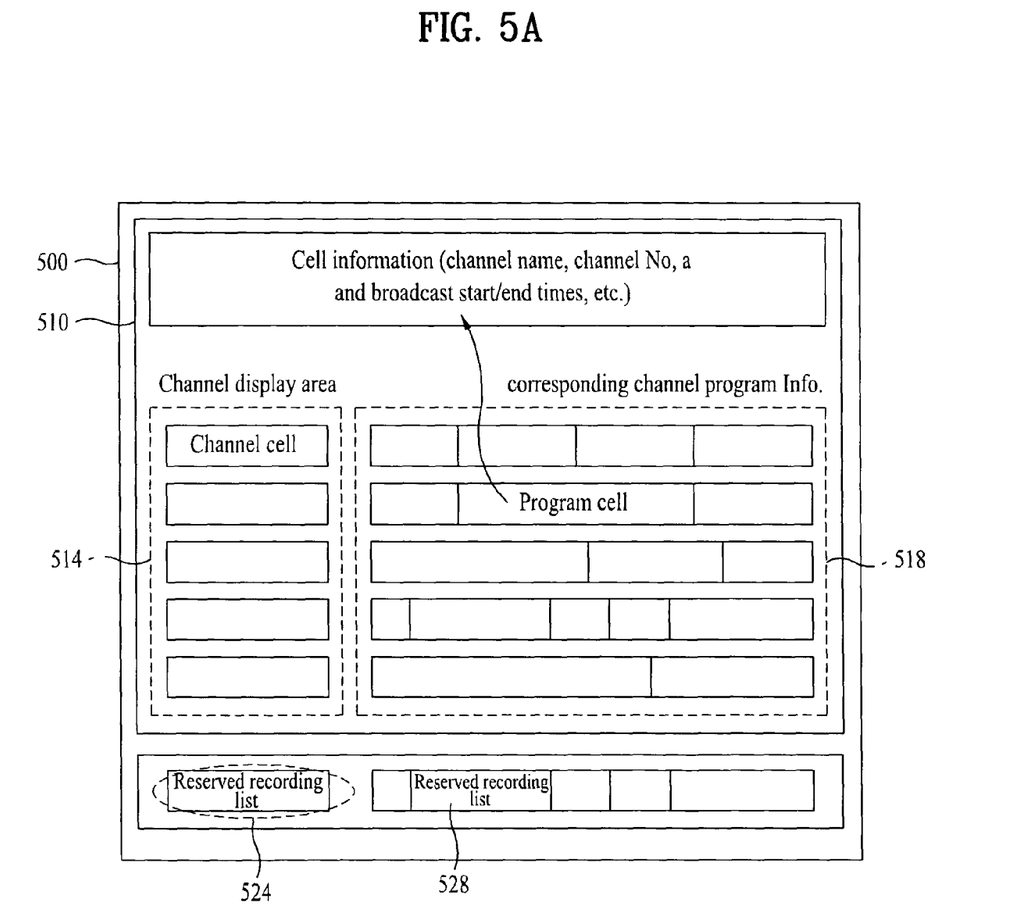
FIG. 5A exemplarily shows an EPG reserved recording list according to a preferred embodiment of the present invention.
Figure 5B:
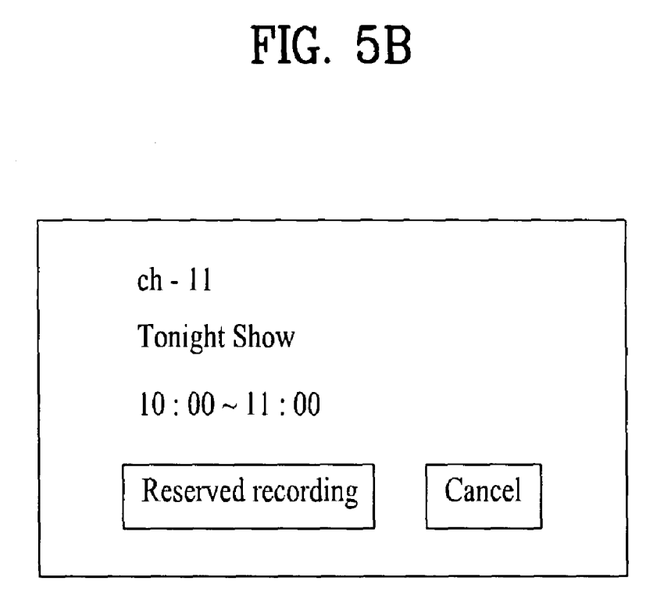
FIG. 5B exemplarily shows an EPG program detailed information image according to a preferred embodiment of the present invention.
Figure 5C:
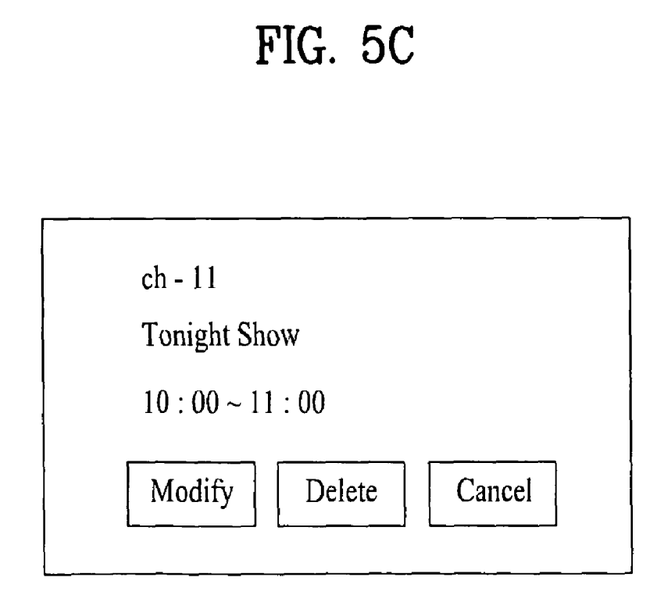
FIG. 5C exemplarily shows a detailed information image of the EPG reserved recording-registered program according to another preferred embodiment of the present invention.

FIG. 4 is a flow chart illustrating a method for modifying/deleting a reserved recording list using EPG reserved recording information according to the present invention. FIG. 5A exemplarily shows an EPG reserved recording list according to a preferred embodiment of the present invention. FIG. 5B exemplarily shows an EPG program detailed information image according to a preferred embodiment of the present invention. FIG. 5C exemplarily shows a detailed information image of the EPG reserved recording-registered program according to another preferred embodiment of the present invention.

Referring to FIG. 4, upon receiving the EPG reserved recording list output signal from the user at step S400, the digital broadcast receiver displays the EPG-reserved recording list information stored in the EPG reserved recording list DB as shown in FIG. 5A at step S402.

The user can select the EPG reserved recording list output command using a hot key or a specific menu key.

The displayed EPG reserved recording list will hereinafter be described with reference to FIG. 5A.

Referring to FIG. 5A, the EPG reserved recording information display image 500 includes an EPG information provision area 510 and a reserved recording list provision area 520.

The EPG information provision area 510 includes a channel display area 514 and a channel program information display area 518.

The channel display area 514 is composed of a plurality of channel cells capable of providing channel information. The channel program information display area 518 provides a corresponding program title for each cell.

If the user selects a desired program cell from the channel program information display area 518, the digital broadcast receiver displays a detailed information image of a corresponding program as shown in FIG. 5B.

A variety of information is displayed on the detailed information image, for example, detailed information (e.g., a channel number, a program title, and a broadcast start/end time) of the corresponding program, a reserved recording button, and a cancellation button, etc., as shown in FIG. 5B.

The user can perform reserved recording of the corresponding program using the reserved recording button.

The reserved recording list provision area 520 includes a reserved recording display cell 524 and a reserved recording list display area 528. In this case, the reserved recording display cell 524 displays a specific status that a corresponding cell indicates a reserved recording list.

The reserved recording display cell 524 displays a specific term "Reserved Recording List".

The reserved recording list display area 528 displays a channel number or program title of the reserved recording program registered by the user in cell units.

If the user selects a cell corresponding to the user-registered reserved recording program to view detailed information of the reserved recording program, the digital broadcast receiver displays the detailed information image of the program as shown in FIG. 5C.

The detailed information image of the program will hereinafter be described with reference to FIG. 5C. A variety of information is displayed on the detailed information image of FIG. 5C, for example, detailed information (e.g., a channel number, a program title, and a broadcast start/end time) of the corresponding program, a reserved recording modification button, a reserved recording deletion button, and a cancellation button, etc.

If the user desires to modify reserved recording data of the reserved recording program, the user can modify a recording time of the program into another time by clicking on the reserved recording modification button.

If the user desires to cancel (or delete) the reserved recording of the reserved recording program, the user can cancel the reserved recording of the above-mentioned reserved recording program by clicking on the reserved recording cancellation button.

As described above, if the user modifies or cancels the reserved recording of the corresponding program using the EPG-reserved recording list, the digital broadcast receiver modifies or cancels the program's reserved recording data stored in the reserved recording list DB.

Needless to say, the digital broadcast receiver can also modify or cancel the program's reserved recording data stored in the EPG-reserved recording list DB.

Referring to FIG. 4, if the EPG-reserved recording list information stored in the EPG reserved recording list DB is displayed as shown in FIG. 5A at step S402, and the user selects a desired program cell from among the reserved recording list provision area of the displayed EPG reserved recording list at step S404, the digital broadcast displays an detailed information image of the selected program as shown in FIG. 5C at step S406.

A variety of information is displayed on the detailed information image of FIG. 5C, for example, detailed information (e.g., a channel number, a program title, and a broadcast start/end time) of the corresponding program, a reserved recording modification button, a reserved recording deletion button, and a cancellation button, etc.

The user can modify or delete reserved recording data of the corresponding program by referring to the detailed information image of FIG. 5C.

If the user modifies or deletes the reserved recording data of the corresponding program at step S408, the digital broadcast receiver modifies or deletes corresponding program information stored in the reserved recording list DB, such that it updates the reserved recording list DB at step S410.

Thereafter, the digital broadcast reads the reserved recording list from the updated reserved recording list DB at step S412, and modifies the read reserved recording list into another list to be displayed on the EPG cell at step S414.

The digital broadcast receiver generates individual cells in the reserved recording list display area, and displays individual information registered in the reserved recording list at step S416, such that it updates the pre-stored EPG-reserved recording list at step S418.

In this way, if a cell for the reserved recording list is added to the EPG, the user can easily check, modify, or delete all information associated with the reserved recording function on the EPG, such that the user can conveniently manage the reserved recording information on the EPG.

As apparent from the above description, a broadcast receiver and a method for managing reserved recording information according to the present invention can generate reserved recording information of a broadcast program using the EPG, can perform registration, modification, and cancellation of a reserved recording on the EPG.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for managing reserved recording information of a broadcast receiver, the method comprising:
    receiving a reserved recording signal of a specific program;
    storing reserved recording information of the program registered on the basis of the reserved recording signal in a reserved recording list database;
    loading the stored reserved recording information from the reserved recording list database, inserting the loaded reserved recording information into a pre-stored Electronic Program Guide (EPG) information, and creating an EPG-reserved recording list using the reserved recording information;
    displaying the EPG-reserved recording list and receiving a reserved information modification signal of a program selected from a display area of the displayed EPG-reserved recording list;
    modifying the reserved recording information of the reserved recording list database based on the reserved information modification signal;
    loading the modified reserved recording information from the reserved recording list information; and
    updating the EPG-reserved recording list using the loaded reserved recording information,
    wherein the displayed EPG-reserved recording list includes an EPG information provision area for displaying the EPG information and a reserved recording list provision area for displaying the reserved recording information,
    wherein the EPG information provision area includes channel information indicating at least one channel provided by a broadcaster and titles of programs broadcasted in said at least one channel,
    wherein the EPG-reserved recording list further includes a detailed information area for displaying a detailed information image corresponding to a single cell selected from among the reserved recording list provision area, and
    wherein the EPG-reserved recording list is displayed independently and separately from the EPG information provision area such that a scrolling operation performed in the EPG information provision area does not scroll the reserved recording information included in the EPG-reserved recording list.

2. The method according to claim 1, further comprising:
    storing the created EPG-reserved recording list in an EPG-reserved recording list database (DB).

3. The method according to claim 1, wherein the reserved recording list provision area includes:
    a reserved recording display cell; and
    a reserved recording list display area for displaying a channel number of the reserved recording program registered by a user in cell units.

4. The method according to claim 1, further comprising:
    receiving EPG information corresponding to the reserved recording information of the registered program;
    modifying a start time of recording the registered program to match with a start time included in the received EPG information; and
    recording the registered program at the modified start time.

5. The method according to claim 1, wherein the EPG provision area displaying the EPG information and the reserved recording list provision area displaying the reserved recording information are respectively displayed in first and second sub-display windows within the same window.

6. The method according to claim 5, wherein the first sub-display window including the EPG provision area display is displayed above the second sub-display window including the reserved recording list provision area with a space between the first and second sub-windows.

7. The method according to claim 5, wherein the channel and titles of programs in the channel information are displayed vertically within the first sub-display window and channels and/or programs reserved in the second sub-display window are displayed horizontally within the second sub-display window.

8. A method for managing reserved recording information of a broadcast receiver, the method comprising:
    receiving a reserved recording list output signal;
    displaying a pre-stored EPG (Electronic Program Guide)-reserved recording list on the basis of the received signal;
    if a single cell is selected from among a display area of the displayed EPG-reserved recording list, displaying a detailed information image of a program corresponding to the selected cell and receiving a reserved information modification signal of the program; and
    modifying reserved information of the program based on the reserved information modification signal,
    wherein the pre-stored EPG-reserved recording list is created by inserting reserved recording information stored in a reserved recording list database into a pre-stored EPG information and the displayed EPG-reserved recording list includes an EPG information provision area for displaying the EPG information and a reserved recording list provision area for displaying the reserved recording information,
    wherein the EPG information provision area includes channel information indicating at least one channel provided by a broadcaster and titles of programs broadcasted in said at least one channel,
    wherein the pre-stored EPG-reserved recording list further includes a detailed information area and the detailed information image is displayed on the detailed information area, wherein the modifying the reserved information of the program includes:
    modifying the reserved recording information of the reserved recording list database based on the reserved information modification signal;
    loading the modified reserved recording information from the reserved recording list information; and
    updating the pre-stored EPG-reserved recording list using the loaded reserved recording information, and
wherein the EPG-reserved recording list is displayed independently and separately from the EPG information provision area such that a scrolling operation performed in the EPG information provision area does not scroll the reserved recording information included in the EPG-reserved recording list.

9. The method according to claim 8, wherein the detailed information image of the program includes detailed information of the program, a reserved recording modification button, and a reserved recording deletion button.

10. The method according to claim 8, wherein the modifying the reserved information of the program further includes:
    modifying the reserved information based on a signal input using a reserved recording modification button of the detailed information image; and
    deleting the reserved information based on a signal input using a reserved recording deletion button.

11. The method according to claim 8, further comprising:
    upon receiving an EPG output command from a user, displaying the EPG-reserved recording list stored in an EPG-reserved recording list database (DB).

12. The method according to claim 8, wherein the reserved recording list provision area includes a reserved recording display cell, and a reserved recording list display area capable of displaying a channel number and/or a program title of the program registered by the user in cell units.

13. The method according to claim 8, further comprising:
    receiving EPG information corresponding to at least one program included in the EPG-reserved recording list;
    modifying a start time for recording the at least one program to match with a start time included in the received EPG information; and
    recording the registered program at the modified start time.

14. A method for managing reserved recording information of a broadcast receiver, the method comprising:
    receiving a reserved recording list output signal;
    displaying a pre-stored EPG (Electronic Program Guide)-reserved recording list on the basis of the received signal and receiving a reserved information modification signal of a program selected from a display area of the displayed EPG-reserved recording list;
    modifying the reserved recording information of a reserved recording list database based on the reserved information modification signal; loading the modified reserved recording information from the reserved recording list database; and
    updating the EPG-reserved recording list using the loaded reserved recording information,
    wherein the EPG-reserved recording list is created by inserting reserved recoding information registered by user into a pre-stored EPG information and the displayed EPG-reserved recording list includes an EPG information provision area for displaying the EPG information and a reserved recording list provision area for displaying the reserved recording information, wherein the EPG information provision area includes channel information indicating at least one channel provided by a broadcaster and titles of programs broadcasted in said at least one channel,
    wherein the EPG-reserved recording list further includes a detailed information area for displaying a detailed information image corresponding to a single cell selected from among the reserved recording list provision area, and
    wherein the EPG-reserved recording list is displayed independently and separately from the EPG information provision area such that a scrolling operation performed in the EPG information provision area does not scroll the reserved recording information included in the EPG-reserved recording list.

15. The method according to claim 14, further comprising:
    if a single cell is selected from among a display area of the displayed EPG-reserved recording list, displaying a detailed information image of a program corresponding to the selected cell.

16. The method according to claim 14, further comprising:
    receiving EPG information corresponding to at least one program included in the EPG-reserved recording list;
    modifying a start time for recording the at least one program to match with a start time included in the received EPG information; and
    recording the registered program at the modified start time.

17. The method according to claim 14, wherein the reserved recording list provision area includes a reserved recording display cell, and a reserved recording list display area capable of displaying a channel number and/or a program title of the program registered by the user in cell units.

18. The method according to claim 15, wherein the detailed information image of the program includes detailed information of the program, a reserved recording modification button, and a reserved deletion button.

19. The method according to claim 15, wherein the modifying the reserved information of the program further includes:
    modifying the reserved information based on a signal input using a reserved recording modification button of the detailed information image; and
    deleting the reserved information based on a signal input using a reserved recording deletion button.

20. A broadcast receiver comprising:
    a User Interface (UI) configured to enter reserved recording information of a broadcast program, to output the reserved recording information, and to receive a reserved information modification signal of a specific program;
    a demultiplexer configured to separate additional information data including Electronic Program Guide (EPG) information from received broadcast signals;
    a controller configured to load the EPG information, to insert the reserved recording information into an EPG-information cell, to create an EPG-reserved recording list, and control to display the created EPG-reserved recording list; and
    a storage unit configured to store the EPG information, the reserved recording information, and the created EPG-reserved recording list,
    wherein the displayed EPG-reserved recording list includes an EPG information provision area for displaying the EPG information and a reserved recording list provision area for displaying the reserved recording information,
    wherein the EPG information provision area includes channel information indicating at least one channel provided by a broadcaster and titles of programs broadcasted in said at least one channel, wherein the EPG-reserved recording list further includes a detailed information area for displaying a detailed information image corresponding to a single cell selected from among a display area of the displayed EPG-reserved recording list, wherein the controller is further configured to modify the reserved recording information of a reserved recording list database based on the reserved information modification signal, to load the modified reserved recording information from the reserved recording list database, and to update the pre-stored EPG-reserved recording list using the loaded reserved recording information, and wherein the EPG-reserved recording list is displayed independently and separately from the EPG information provision area such that a scrolling operation performed in the EPG information provision area does not scroll the reserved recording information included in the EPG-reserved recording list.

21. The broadcast receiver according to claim 20, wherein the controller is further configured to load the EPG-reserved recording list, and to modify the reserved recording information.

22. The broadcast receiver according to claim 20, wherein the storage unit is further configured to update the EPG-reserved recording list with the modified reserved recording information.

23. The broadcast receiver according to claim 20, further comprising:
   a receiving unit configured to receive EPG information corresponding to the broadcast program included in the EPG-reserved recording list,
   wherein the controller is further configured to modify a start time for recording the at least one program to match with a start time included in the received EPG information, and to record the registered program at the modified start time.

* * * * *